United States Patent
Kumar et al.

(10) Patent No.: US 12,490,180 B2
(45) Date of Patent: Dec. 2, 2025

(54) SERVICE-BASED JOINING OF PINE INTO PERSONAL IoT NETWORK

(71) Applicant: SAMSUNG ELECTRONICS CO., LTD., Suwon-si (KR)

(72) Inventors: Lalith Kumar, Bangalore (IN); Anoop Perumudi Veedu, Bangalore (IN); Kailash Kumar Jha, Bangalore (IN); Sidhant Jain, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 396 days.

(21) Appl. No.: 18/312,400

(22) Filed: May 4, 2023

(65) Prior Publication Data

US 2023/0362803 A1    Nov. 9, 2023

(30) Foreign Application Priority Data

| May 5, 2022 | (IN) | ............................. 202241026290 |
| May 6, 2022 | (IN) | ............................. 202241026473 |
| Apr. 18, 2023 | (IN) | ............................. 202241026290 |

(51) Int. Cl.
*H04W 48/18* (2009.01)
*H04W 12/06* (2021.01)
(Continued)

(52) U.S. Cl.
CPC ............ *H04W 48/18* (2013.01); *H04W 12/06* (2013.01); *H04W 48/16* (2013.01); *H04W 84/18* (2013.01)

(58) Field of Classification Search
CPC ...... H04W 84/18; H04W 12/06; H04W 48/16
See application file for complete search history.

(56) References Cited

U.S. PATENT DOCUMENTS

| 2019/0215244 A1 | 7/2019 | Choi |
| 2019/0281118 A1* | 9/2019 | Kim .................... H04L 67/34 |
| 2020/0120160 A1* | 4/2020 | Estes ................... G06F 9/30 |

FOREIGN PATENT DOCUMENTS

| CN | 107896376 A | 4/2018 |
| TW | 202020708 A | 6/2020 |
| WO | 2021091490 A1 | 5/2021 |

OTHER PUBLICATIONS

International Search Report and Written Opinion of the International Searching Authority dated Aug. 2, 2023, in connection with International Application No. PCT/KR2023/006134, 6 pages.

(Continued)

*Primary Examiner* — Tuan H Nguyen

(57) ABSTRACT

The disclosure relates to a 5G, 6G, or personal IoT network communication system for supporting a higher data transmission rate. The method of PEMC comprises: transmitting a first message comprising information related to a personal internet of things network (PIN); receiving, from a first personal internet of things network element (PINE), a first joining request message comprising information on a supported service of the first PINE; determining whether to add the first PINE in the PIN based on the information on the supported service; and transmitting, to the first PINE, a first joining accept message comprising at least one identifier (ID) of at least one PINE in the PIN based on a determination that the first PINE is added in the PIN.

20 Claims, 8 Drawing Sheets

(51) Int. Cl.
*H04W 48/16* (2009.01)
*H04W 84/18* (2009.01)

(56) References Cited

OTHER PUBLICATIONS

3GPP TR 23.700-78 V0.2.0 (Apr. 2022); 3rd Generation Partnership Project; Technical Specification Group Services and System Aspects; Study on Application layer support for Personal IoT Network; (Release 18), Apr. 2022, 15 pages.
Vivo et al., "Solution for KI#1—PINAPP architecture and PIN management", S6-220803, (revision of S6-220574r06), 3GPP TSG-SA WG6 Meeting #48-e, e-Meeting, Apr. 5-14, 2022, Online, 6 pages.
Supplementary European Search Report dated Jul. 7, 2025, in connection with European Patent Application No. 23799711.9, 11 pages.
Examination report issued May 6, 2025, in connection with Indian Patent Application No. 202241026290, 8 pages.
3GPP TS 23.542 V0.2.0 (Mar. 2023) Technical Specification; 3rd Generation Partnership Project; Technical Specification Group Services and System Aspects; Application layer support for Personal IoT Network; (Release 18); 73 pages.
3GPP TR 23.700-88 V0.2.0 (Apr. 2022) Technical Report; 3rd Generation Partnership Project; Technical Specification Group Services and System Aspects; Study on architecture enhancements for Personal IoT Network (PIN) (Release 18); 60 pages.

* cited by examiner

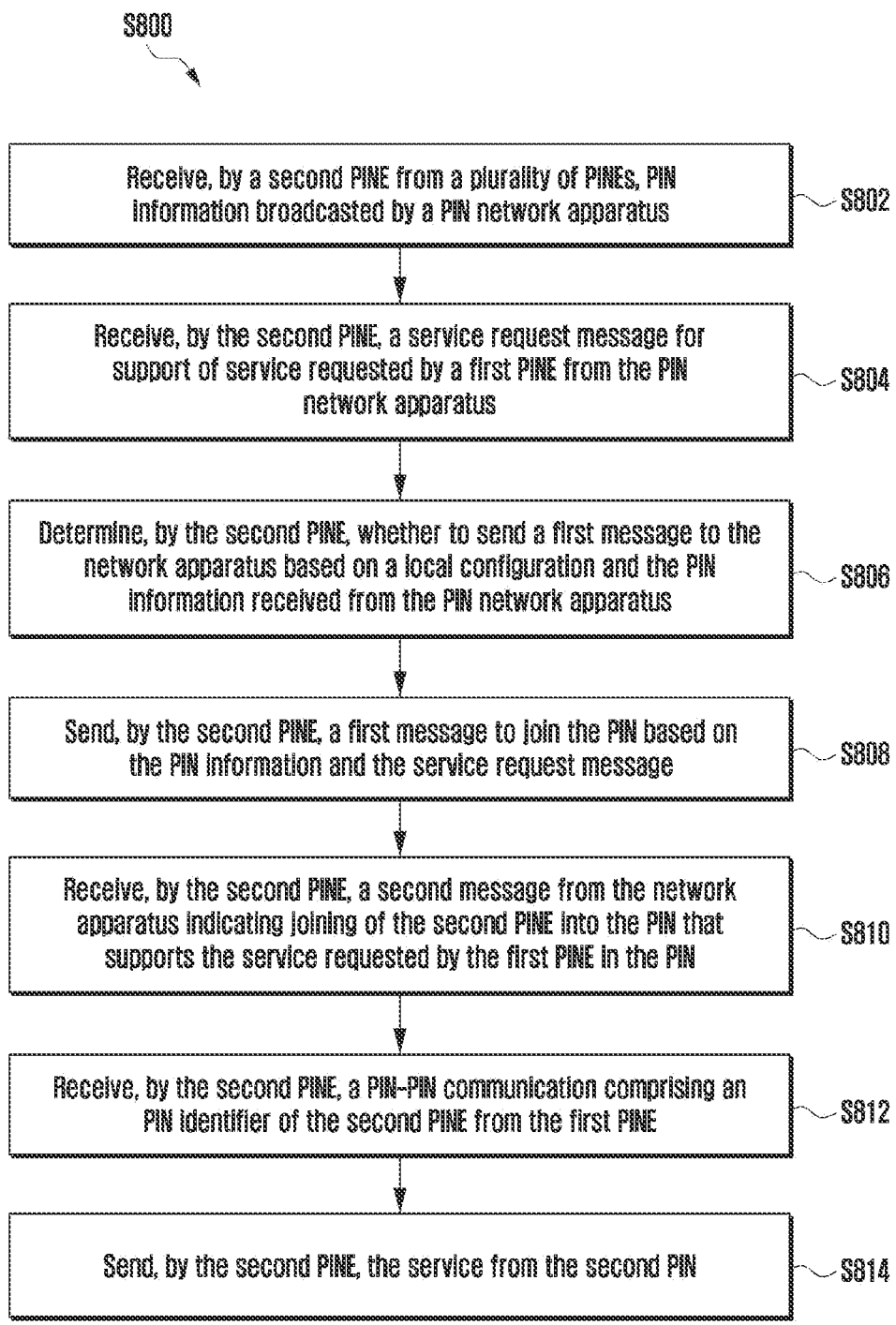

SERVICE-BASED JOINING OF PINE INTO PERSONAL IoT NETWORK

CROSS-REFERENCE TO RELATED APPLICATIONS

This application is based on and claims priority under 35 U.S.C. § 119 to Indian Patent Application No. 202241026290 filed on May 5, 2022, Indian Patent Application No. 202241026473 filed on May 6, 2022, and Indian Patent Application No. 202241026290 filed on Apr. 18, 2023, in the Indian Intellectual Property Office, the disclosure of which is incorporated by reference herein in its entirety.

BACKGROUND

1. Field

The present disclosure relates to a method and a system for joining a personal Internet of Things (IoT) network element (PINE) into a personal IoT network (PIN) based on a service request.

2. Description of Related Art $5^{th}$ generation (5G) mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, meta-verse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, meta-material-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

There are multiple PINs in an environment supported by one or more PIN element with gateway capability (PEGC) and PIN element with management capability (PEMC). A first PINE want to receive a particular service e.g., printer service, and the service may be supported by another PINE (i.e., second PINE) which is not joined to the PIN yet. Details on how to setup communication between the first PINE and the second PINE, in order for the first PINE to access the service of the second PINE is not defined in existing methods or systems.

Also, there is no procedures for how the PINE needs to be released from a PIN is not defined in the existing methods or systems. In other words, there is no procedures defined in the prior arts for how the PINE needs to be released from the PIN.

It is desired to address the above mentioned disadvantages or other short comings or at least provide a useful alternative.

The technical subjects pursued in the disclosure may not be limited to the above mentioned technical subjects, and other technical subjects which are not mentioned may be clearly understood, through the following descriptions, by those skilled in the art to which the disclosure pertains.

The principal object of the embodiments herein is to provide a method and a system for joining a PINE into a PIN based on a service request.

Another object of the embodiments herein is to release the PINE from the PIN.

Another object of the embodiments herein is to provide that a PIN network apparatus (e.g., PEMC, PIN network function (PINNF), PIN application function (PINAF), PEGC or the like) announces or broadcasts PIN information to available PINEs. When the PINE wants to join the PIN, the PINE sends a PIN join request. The PINE provides a list of services offered by the PINE and list of services needed by the PINE.

Another object of the embodiments herein is to provide that the PIN network apparatus broadcasts or announces a request to find the PINE offering the requested service. If the PINE receiving the announcement offers the requested service, the PINE sends a PIN join request or any signal to join the PIN and offers the requested service to the requesting PINE.

Another object of the embodiments herein is to define a mechanism in which the PINE provides information of required/requested services to the PIN network apparatus, and the PIN network apparatus finds the PINE which can provide the requested service and includes the requested service into the PIN to offer that service to the requesting PINE.

Accordingly, the embodiments herein provide a method for service-based joining of a PINE into a PIN. The method includes broadcasting, by a PIN network apparatus, PIN information to a plurality of PINEs. Further, the method includes receiving, by the PIN network apparatus, a first message to join the PIN from a first PINE from the plurality of PINEs based on the PIN information. The first message includes security credentials of the first PINE, a service offered by the first PINE and a service requested by the first PINE in the PIN. Further, the method includes determining, by the PIN network apparatus, a second PINE from the plurality of PINEs that supports the service requested by the first PINE in the PIN. Further, the method includes adding, by the PIN network apparatus, the first PINE into the PIN based on the security credentials of the first PINE and the PIN information. Further, the method includes sending, by the PIN network apparatus, a second message to the first PINE indicating joining of the first PINE into the PIN. The second message includes an PIN identifier of the second PINE that supports the service requested by the first PINE in the PIN.

In an embodiment, determining, by the PIN network apparatus, the second PINE that supports the service requested by the first PINE in the PIN includes detecting, by the network apparatus, that the second PINE that supports the service requested by the first PINE has not joined the PIN, sending, by the PIN network apparatus, a service request message to the plurality of PINEs to detect the second PINE that supports the service requested by the first PINE in the PIN, receiving, by the PIN network apparatus, a first message to join the PIN from the second PINE. The first message includes security credentials of the second PINE, the service offered by the second PINE, adding, by the PIN network apparatus, the second PINE into the PIN based on the security information of the second PINE and the PIN information, and sending, by the PIN network apparatus, a second message to the second PINE indicating joining of the second PINE into the PIN that supports the service requested by the first PINE in the PIN.

In an embodiment, the method includes starting, by the network apparatus, a timer after sending the service request message to the plurality of PINEs to detect the second PINE that supports the service requested by the first PINE in the PIN. The timer includes a timer window within which the network apparatus expects join requests from the second PINE of the plurality of PINE. Further, the method includes determining, by the network apparatus, whether the join request is received from the second PINE before expiry of the timer. In an embodiment, the method includes adding, by the PIN network apparatus, the second PINE into the PIN when the join request is received from the second PINE before expiry of the timer. In another embodiment, the method includes sending PIN reject request message to the first PINE indicating the service is not available in the PIN when the join request is not received from the second PINE before expiry of the timer.

In an embodiment, adding, by the PIN network apparatus, the second PINE into the PIN based on the security credentials of the second PINE and the PIN information includes validating, by the PIN network apparatus, the second PINE based on the security credentials of the second PINE and the PIN information, and adding, by the PIN network apparatus, the second PINE into the PIN upon successful validation of the second PINE.

In an embodiment, the PIN information includes a supported service or device type indicating a particular service supported by PINE available in the PIN, a requested Service or device type indicating the requested service which PINE may support, a Group ID or a PIN identifier, a time window within which the network apparatus expects join requests from PINE of the plurality of PINE, and a user defined name indicating in which PIN PINE to be added.

In an embodiment, adding, by the PIN network apparatus, the first PIN into the PIN based on the security credentials of the first PINE and the PIN information includes validating, by the PIN network apparatus, the first PINE based on the security credentials of the first PINE and the PIN information, and adding, by the PIN network apparatus, the first PIN into the PIN upon successful validation of the first PINE.

Accordingly, the embodiments herein provide a method for service-based joining of PINE into a PIN. The method includes receiving, by a first PINE from a plurality of PINEs, PIN information broadcasted by a PIN network apparatus. Further, the method includes determining, by the first PINE, whether to send a first message to the PIN network apparatus based on at least one of a local configuration and the PIN information received from the PIN network apparatus. Further, the method includes sending, by the first PINE, a first message to join the PIN based on the PIN information. The first message includes security credentials for verification of the first PINE, service offered by the first PINE and the service requested by the first PINE in the PIN. Further, the method includes receiving, by the first PINE, a second message from the PIN network apparatus indicating joining of the first PINE into the PIN. The second message includes an PIN identifier of the second PINE that supports the service requested by the first PINE in the PIN. Further, the method includes performing, by the first PINE, a PIN-PIN communication with a second PINE based on the PIN identifier of the second PINE. Further, the method includes receiving, by the first PINE, the service from the second PIN.

Accordingly, the embodiments herein provide a method for service-based joining of PINE into a PIN. The method includes receiving, by second PINE from a plurality of PINEs, PIN information broadcasted by a PIN network apparatus. Further, the method includes receiving, by the second PINE from a plurality of PINEs, a service request message for support of service requested by a first PINE from the PIN network apparatus. Further, the method includes determining, by the second PINE, whether to send a first message to the network apparatus based on at least one a local configuration and the PIN information received from the PIN network apparatus. Further, the method includes sending, by the second PINE, a first message to join the PIN based on the PIN information and the service request message. The first message includes security credentials for verification of the second PINE, the service offered by the second PINE and service requested by the second PINE in the PIN. Further, the method includes receiving, by the second PINE, a second message from the network apparatus indicating joining of the second PINE into the PIN that supports the service requested by the first PINE in the PIN. Further, the method includes receiving, by the second PINE, a PIN-PIN communication including an PIN identifier of the second PINE from the first PINE. Further, the method includes sending, by the second PINE, the service from the second PIN.

Accordingly, the embodiments herein provide a PIN network apparatus for service-based joining of PINE into a PIN. The PIN network apparatus includes a service-based PINE controller coupled to a memory and a processor. The service-based PINE controller broadcasts the PIN information to a plurality of PINEs. Further, the service-based PINE controller receives a first message to join the PIN from a first PINE from the plurality of PINEs based on the PIN information. The first message includes security credentials of the first PINE, a service offered by the first PINE and a service requested by the first PINE in the PIN. Further, the service-based PINE controller determines a second PINE from the plurality of PINEs that supports the service requested by the first PINE in the PIN. Further, the service-based PINE controller adds the first PINE into the PIN based on the security credentials of the first PINE and the PIN information. Further, the service-based PINE controller sends a second message to the first PINE indicating joining of the first PINE into the PIN. The second message includes an PIN identifier of the second PINE that supports the service requested by the first PINE in the PIN.

Accordingly, the embodiments herein provide a first PINE for service-based joining into a PIN. The first PINE includes a service-based PINE controller coupled to a memory and a processor. The service-based PINE controller receives PIN information broadcasted by a network apparatus. Further, the service-based PINE controller determines whether to send a first message to the network apparatus based on at least one of a local configuration and the PIN information received from the network apparatus. Further, the service-based PINE controller sends a first message to join the PIN based on the PIN information. The first message includes security credentials for verification of the first PINE, a service offered by the first PINE and a service requested by the first PINE in the PIN. Further, the service-based PINE controller receives a second message from the network apparatus indicating joining of the first PINE into the PIN. The second message includes an PIN identifier of the second PINE that supports the service requested by the first PINE in the PIN. Further, the service-based PINE controller performs a PIN-PIN communication with a second PINE based on the PIN identifier of the second PINE. Further, the service-based PINE controller receives the service from the second PIN.

Accordingly, the embodiments herein provide a second PINE for service-based joining into a PIN. The second PINE includes a service-based PINE controller coupled to a memory and a processor. The service-based PINE controller receives PIN information broadcasted by a network apparatus. Further, the service-based PINE controller receives a service request message for support of a service requested by a first PINE from the network apparatus. Further, the service-based PINE controller determines whether to send a first message to the network apparatus based on at least one a local configuration and the PIN information received from the network apparatus. Further, the service-based PINE controller sends a first message to join the PIN based on the PIN information and the service request message. The first message includes security credentials for verification of the second PINE, a service offered by the second PINE and the service requested by the second PINE in the PIN. Further, the service-based PINE controller receives a second message from the network apparatus indicating joining of the second PINE into the PIN that supports the service requested by the first PINE in the PIN. Further, the service-based PINE controller receives a PIN-PIN communication including an PIN identifier of the second PINE from the first PINE. Further, the service-based PINE controller sends the service from the second PIN.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments, and the embodiments herein include all such modifications.

The present disclosure provides an effective and efficient method for joining of PINE into personal network. Advantageous effects obtainable from the disclosure may not be limited to the above mentioned effects, and other effects which are not mentioned may be clearly understood, through the following descriptions, by those skilled in the art to which the disclosure pertains.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

This disclosure is illustrated in the accompanying drawings, throughout which like reference letters indicate corresponding parts in the various figures. The embodiments herein will be better understood from the following description with reference to the drawings, in which:

FIG. 8 illustrates a flow chart of a method, implemented by the second PINE, for service-based joining of the PINE into the PIN according to embodiments as disclosed herein.

Figure 1:
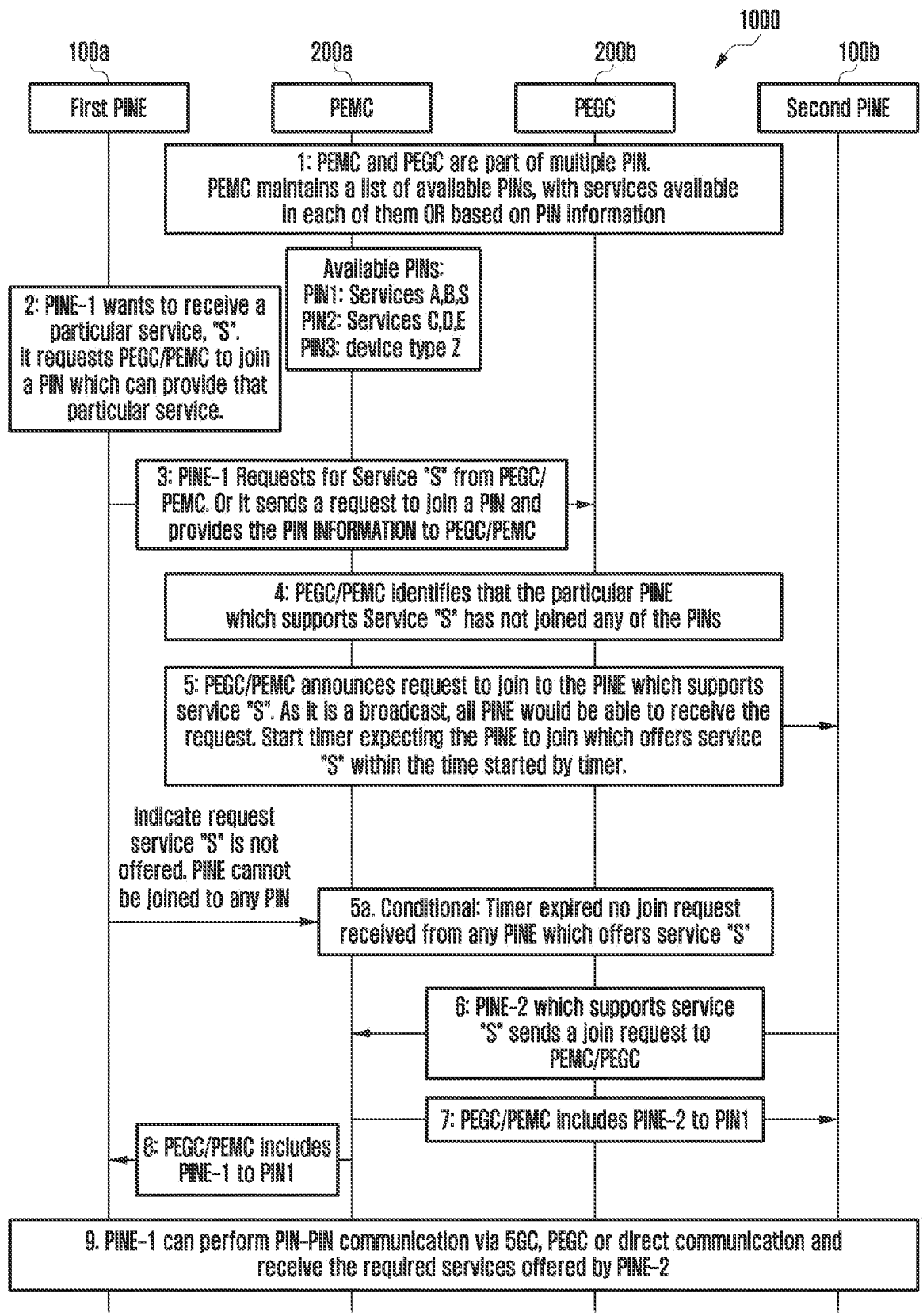
FIG. 1 illustrates a method of setting up communication between a PINE, and a PIN based on a service requirement according to an embodiment as disclosed herein.

It may be noted that to the extent possible, like reference numerals have been used to represent like elements in the drawing. Further, those of ordinary skill in the art will appreciate that elements in the drawing are illustrated for simplicity and may not have been necessarily drawn to scale. For example, the dimension of some of the elements in the drawing may be exaggerated relative to other elements to help to improve the understanding of aspects of the present disclosure. Furthermore, the one or more elements may have been represented in the drawing by conventional symbols, and the drawings may show only those specific details that are pertinent to the understanding the embodiments of the present disclosure so as not to obscure the drawing with details that will be readily apparent to those of ordinary skill in the art having benefit of the description herein.

DETAILED DESCRIPTION

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by a firmware. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Expansion of the abbreviations used in the patent disclosure in given below:
a) 3GPP 3$^{rd}$ generation participation project;
b) 5GC 5G core network;
c) D2D device to device;
d) FQDN fully qualified domain Name;
e) PEGC PIN element with gateway capability;
f) PEMC PIN element with management capability;
g) PIN personal IoT network;
h) PIN-E PIN element;
i) ProSe proximity services;
j) QoS quality of service; and/or
k) UE user equipment.

Expansion and definition of the abbreviations used in the patent disclosure in given below:
a) PIN (personal IoT network): personal IoT networks (PINs) provide local connectivity between UEs and/or non-3GPP devices. A personal IoT network (PIN) consists of PIN elements (PINE) that communicate using PIN direct connection or direct network connection and is managed locally (using a PIN element with management capability);
b) PINE (PIN element): PIN elements are UEs and/or non-3GPP devices which form part of the PIN;
c) PEMC (PIN element with management capability): PIN element which have the capability to provide means for an authorised administrator to configure and manage a PIN;
d) PEGC (PIN element with gateway capability): PIN elements with gateway capability provide means to PIN elements to register and access 5G network services. The PEGC can also help in communication between 2 PIN elements that are not within the range to use direct communication;
e) ProSe: ProSe (proximity services) is a D2D (device-to-device) technology that allows LTE devices to detect each other and to communicate directly;
f) PIN-ID: unique identifier associated with a PIN;
g) PINNF (PIN network function): The PIN network function is a 5GC NF responsible for the creation and management of the PIN; and/or
h) PINAF (PIN application function): The PIN application function is a network function connected to 5G Core network via NEF (network exposure function). The PINAF is responsible for policy configuration and provisioning of PIN and its elements in the 5GC and PEGC/PEMC/PINE.

The information (or PIN information) in the present disclosure is defined by at least one of the below:
a) Type of Service (IOT, hospital IOT devices);
b) Type of device (e.g., printer, thermostat);
c) Characteristics;
d) Group ID (kind of PIN-ID it wants to join);
e) Capability (capability like printer etc.); and/or
f) Plain string configured by user or the 5GC in the PEMC or PEGC, when PINE sends that plain string PEMC or PEGC identifies which PIN the PINE may be added. The plane string can be any configurable text, for example, the plain string can be an ID or PIN_NAME or PIN_DISCOVERY name, user readable format etc.

"Type of Service" can be one of the below or any combination of below, it should be noted that this is not exhaustive list:
a) eMBB: enhanced Mobile Broadband;
b) URLLC: ultra-reliable low latency communications;
c) MIoT: massive IoT or IOT;
d) V2X services; and/or
e) High-Performance Machine-Type Communications.

The type of device are for e.g., printer, thermostat also devices which can support "Type of Service" listed above. Characteristics of the devices which can handle "Type of Service" listed above. The group ID is a kind of PIN-ID it wants to join. The capability (capability like printer etc.) or the capability of the devices which can support the "type of service" or "type of devices" listed above.

Accordingly, the embodiments herein provide a method for service-based joining of a PINE into a PIN. The method includes broadcasting, by a PIN network apparatus, PIN information to a plurality of PINEs. Further, the method includes receiving, by the PIN network apparatus, a first message to join the PIN from a first PINE from the plurality of PINEs based on the PIN information. The first message includes security credentials of the first PINE, a service offered by the first PINE and a service requested by the first PINE in the PIN. Further, the method includes determining, by the PIN network apparatus, a second PINE from the plurality of PINEs that supports the service requested by the first PINE in the PIN. Further, the method includes adding, by the PIN network apparatus, the first PINE into the PIN based on the security credentials of the first PINE and the PIN information. Further, the method includes sending, by the PIN network apparatus, a second message to the first PINE indicating joining of the first PINE into the PIN. The second message includes an PIN identifier of the second PINE that supports the service requested by the first PINE in the PIN.

The method can be used for joining a PINE into the PIN based on a service request. In an example, a first PINE request to join a PIN which offers a particular service "s" an entity responsible to create or manage the PIN can broadcast or search for a second PINE which can offer the particular service "s" if the target second PINE joins the PIN, then the first PINE is informed about details of the second PINE after including the information in the same PIN. Later, the first PINE can communicate with the second PINE and receive the required service.

The method can be used for releasing the PINE from a Personal IoT Network (PIN).

In an embodiment, the PINE can request a PEMC/a PINNF/a PINAF through a PEGC or directly connected to a 5GC, to release/delete itself from the PIN. In another embodiment, the PEMC/the PEGC/the PINNF/the PINAF can request release/delete of PINE from the PIN.

Referring now to the drawings, and more particularly to FIG. 1 through FIG. 8, there are shown preferred embodiments.

FIG. 1 illustrates a method of setting up communication between a PINE (100) and PIN (1000) based on a service requirement according to an embodiment as disclosed herein. In an embodiment, the information (or PIN information) is defined by at least one of a type of service (e.g., IOT, hospital IOT devices), a type of device (e.g., printer, thermostat or the like), a characteristics, a group ID (kind of PIN-ID it wants to join), and a Capability (capability like printer etc.). A plain string configured by a user (user readable format) or a 5GC in a PEMC (200A) or a PEGC (200B), when the PINE (100) sends that a plain string the PEMC (200A) or the PEGC (200B) identifies which PIN (1000) the PINE (100) may be added. The plain string can be any configurable text, for example, the plain string can be an ID or PIN_NAME or PIN_DISCOVERY name etc.

At step 1, the PEMC (200A) and the PEGC (200B) are part of multiple PINs. The PEMC (200A) (or any other entity responsible to manage the PIN) maintains the list of available PINs, with services available in each of them. The PEMC (200A) may be taken as only example in this embodiment this can be any entity which manages the PIN (1000) for example PEMC (200A)/PEGC (200B)/PINNF (300)/PINAF (400)/an user) maintains a list of available PINs based on any of the information (also called as PIN information in an embodiment).

At step 2, a first PINE (100a) wants to receive a particular service "S," e.g., printer. At step 3, the first PINE (100a) requests the PEGC (200B)/PEMC (200A) to join the PIN (1000) which can provide the particular service "S" (based on at least one of the PIN information (i.e., type of device/characteristic/type of service etc.)) or the first PINE (100a) is already part of the PIN (1000) but the first PINE (100a) requests a destination PINE details which can provide the particular service "S" or the first PINE (100a) just indicates that the first PINE (100a) wants to receive service "S."

At step 4, the PEMC (200A)/the PINMF identifies that the PINE (100) (or any PINE) which offers that service "S" has not joined any of the PINs or the PIN (1000) in which the PINE (100) is currently part of. At step 5, the PEMC (200A)/PINMF/PINNF (300)/PEGC (200B)/PINAF (400)/user announces request to join to the PINE (100) which supports service "S." As PEMC (200A)/PINMF/PINNF (300)/PEGC (200B)/PINAF (400) broadcasts or announces the request, all PINE (100) may be able to receive the information that the PEMC (200A)/PEGC (200B) are looking for the PINE (100) which can support the service "S" and it's a request for that respective PINE (100) to join the PIN.

The PEMC (200A)/PINMF/PINNF (300)/PEGC (200B)/PINAF (400)/user starts a timer waiting for a trigger from the PINE (100) to join the PIN (1000) which supports the service "S." If the timer expires, then the PEMC (200A)/PINMF/PINNF (300)/PEGC (200B)/PINAF (400)/user indicates a reject message to the first PINE and indicates that the requested service is not offered. At step 6, the second PINE (100b) which supports the service "S" sends a signal for example join request to the PEMC (200A)/PEGC (200B)/PINNF (300)/PEGC (200B)/PINAF (400)/user to join the PIN (1000) or if the second PINE (100b) is already part of the PIN (1000) it indicates it can offer required service "S."

At step 7, the PEGC (200B)/PEMC (200A)/PINNF (300)/PEGC (200B)/PINAF (400)/user includes the second PINE (100b) to a first PIN. At step 8, the PEGC (200B)/PEMC (200A) includes the first PINE (100a) to the first PIN. The PEGC (200B)/the PEMC (200A) also provides second PINE information to the first PINE like FQDN/IP-address or any other identifier which is used during communication and to identify the second PINE (100b). At step 9, the first PINE (100a) can perform PIN-PIN communication via 5GC, the PEGC (200B) or direct communication and receive the required services "S" offered by the second PINE (100b).

In an embodiment, the first PINE (100a) indicates requested service as one service is only for illustration. The service can be one or more services. In an embodiment, the PEMC (200A) is just representative entity and the PEMC (200A) can be any entity part of PIN (1000) or in the 5GC or at the application layer like PINNF (300)/PEGC (200B)/PINAF (400)/user (also called as upper layers). The PEMC (200A) can be single entity or network function or the PEMC (200A) can be multiple network functions/entities interacting with each other.

In an embodiment, when the PEMC (200A) or any other entity announces that the particular service is required then the PEMC (200A) or any other entity can also provide details about the first PINE (100a) which want to receive the service, based on discoverability criteria of the destination PINE i.e., second PINE (100b) in this embodiment, the second PINE (100b) can decide whether to join the PIN (1000) and offer services to the first PINE (100a). If the second PINE (100b) decides that the second PINE (100b) cannot offer services to the first PINE (100a) and the second PINE (100b) can indicate the same to PEMC (200A) or not respond to the PEMC (200A) announce request.

Figure 2:
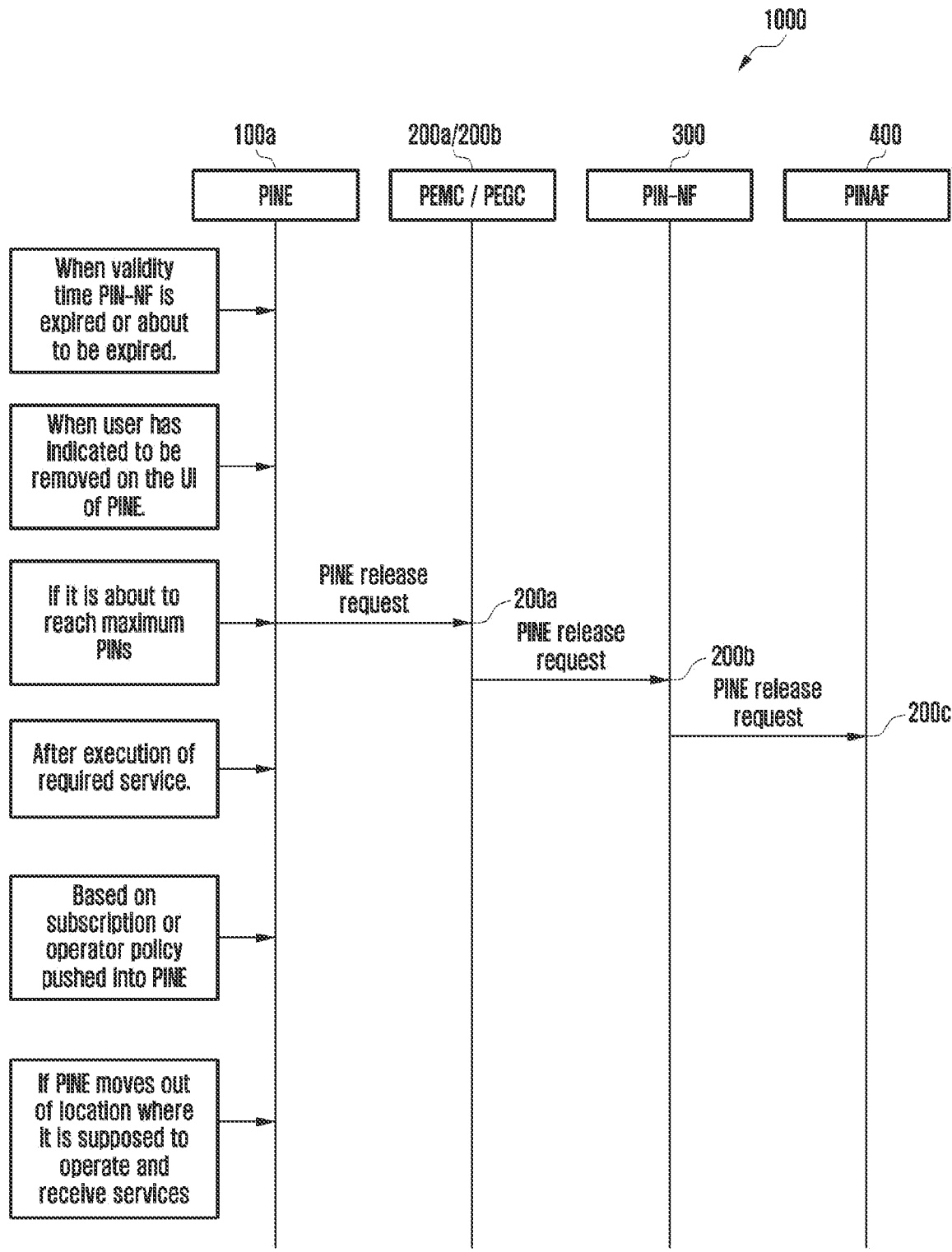
FIG. 2 illustrates a release/delete operation initiated by the PINE according to embodiments as disclosed herein.

FIG. 2 illustrates a release/delete operation initiated by the PINE (100) according to embodiments as disclosed herein.

The PINE (100) can request the PEMC (200A)/the PINNF (300)/the PINAF (400) through the PEGC (200B) or directly connected to a 5GC, to release/delete itself from the PIN (1000). The PINE (100) can request a release/delete from the PIN (1000) based on one of the below conditions and not limited to:
1) When validity time is expired or about to be expired
   I. 5GC/PEMC (200A)/PINNF (300)/PINAF (400) may assign a validity timer for the PINE (100).
   II. The PINE validity timer may be started by the PINE (100) when the PINE (100) is registered/joined into the PIN (1000) or based on the indication from the PEMC (200A)/PEGC (200B)/PINNF (300)/PINAF (400)/user.
   III. Upon expiry of the validity timer, the PINE (100) can request a release/delete from the PIN (1000).
2) When the user has indicated to remove a PIN (1000) for example on the user interface of PINE (100).
   I. The PINE (100) can have a user interface, and user may initiate release/delete of the PINE (100) from PIN (100)) using the user interface.
3) If the PINE (100) is about to be reach Maximum possible PINs.
   I. 5GC/PEMC (200A)/PINNF (300)/PINAF (400)/user may assign a Max PIN values for the PINE (100).
   II. When the PINE (100) has already joined Maximum possible PINs and the PINE (100) can request release from any existing PIN (1000) if the UE determines to join the new PIN.
   III. Additionally, upon receiving the release request from the PINE (100), the PEMC (200A)/the PINNF (300)/the 5GC/the PINAF (400) can trigger the PIN release based on policy considerations such as operator policy, priority of the PIN, priority of the PINE (100) within each PIN (1000) etc.,
4) After execution of the required service
  I. The PINE (100) can be added dynamically to the PIN (1000) based on the required service. Thus, upon completion of the specific service, the PINE (100) can request release/delete from the PIN (1000).
5) Based on operator policy pushed into PINE (100) or subscription.
  I. The PINE (100) can request release/delete from PIN (1000) based on operator policy or subscription. i.e., for example, the subscription is expired which can be based on amount of data consume or time validity of the subscription.
6) When the PINE (100) moves out of the location, the PINE (100) is supposed to operate and receive PIN services.
  I. If the PINE (100) detects that the PINE (100) is moving out of the location (using any location estimation technique such as Geolocation tracking, explicit message from PEMC (200A)/PEGC (200B)/PINNF (300)/5GC), the PINE (100) can trigger a release request to the PIN (1000).
  II. Additionally, if the PINE (100) is out of PIN location area, the PINE (100) can also implicitly release itself from the PIN (1000).

The below various embodiments disclose about the PINE release/delete initiated by the PEMC (200A)/the PEGC (200B)/the PINNF (300)/the PINAF (400).

Figure 3:
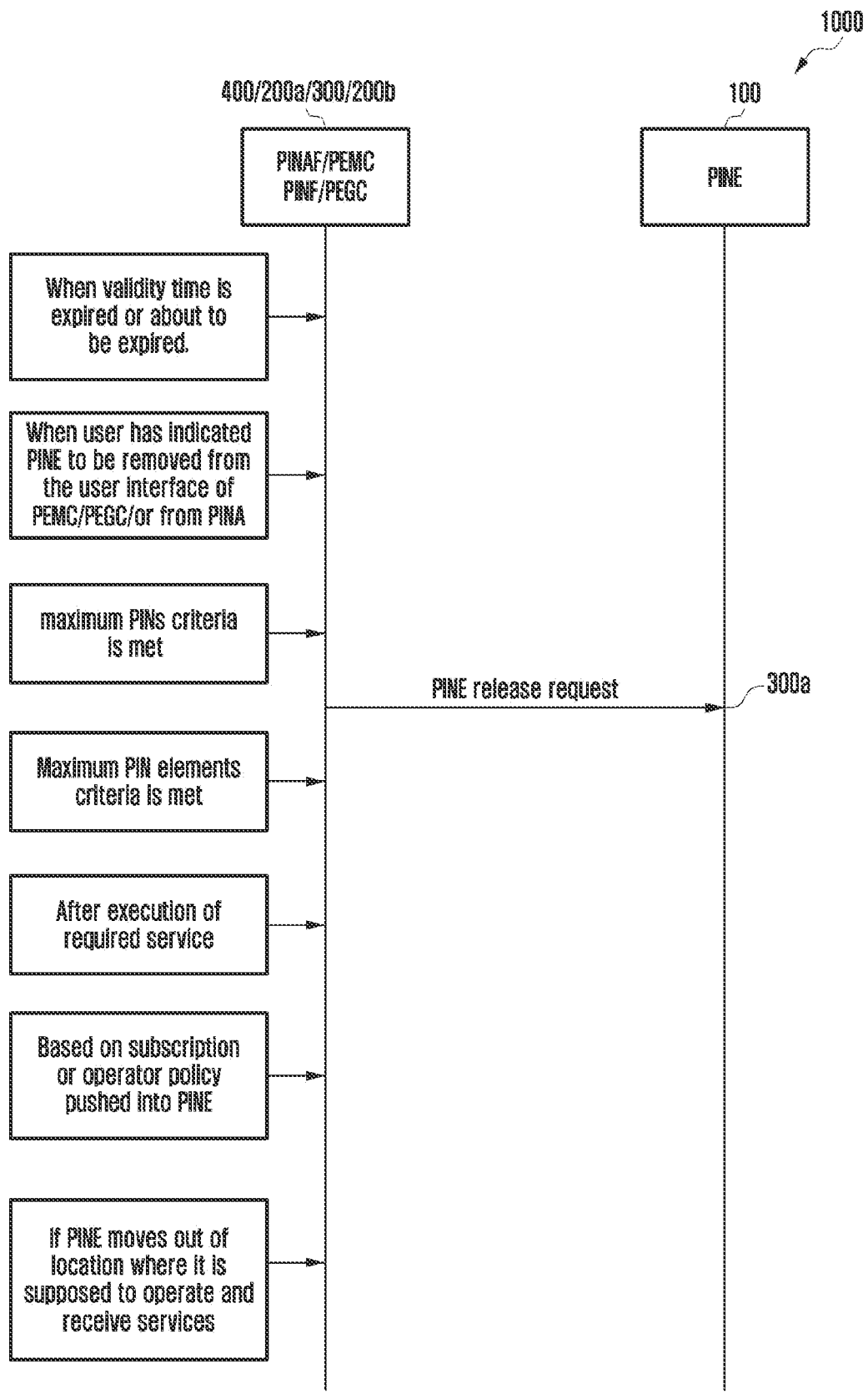
FIG. 3 illustrates a PINE, release/delete initiated by a PEMC/a PEGC/a PINNF/a PINAF according to embodiments as disclosed herein.

FIG. 3 illustrates the PINE release/delete operations initiated by the PEMC (200A)/the PEGC (200B)/the PINNF (300)/the PINAF (400) according to embodiments as disclosed herein.

The PEMC (200A)/the PEGC (200B)/the PINNF (300)/the PINAF (400) can request release/delete of the PINE (100) from the PIN (1000), based on at least one of the below conditions and not limited to:
1) When validity time is expired or about to be expired
  I. The 5GC/the PEMC (200A)/the PINNF (300)/the PINAF (400) may assign a validity, timer for the PINE (100).
  II. The PINE validity timer may be started by the PINE (100) when the PINE (100) is registered/joined into the PIN (1000) or based on the indication from the PEMC (200A)/the PEGC (200B)/the PINNF (300)/the PINAF (400)/the user.
  III. Upon expiry of the validity timer, the PINE (100) can request the release/delete from the PIN (1000).
2) When the user has indicated to release the PINE (100) from the user interface of the PEMC (200A)/the PEGC (200B)/or from the PINAF (400).

The PINE (100) can have a user interface, and user may initiate release/delete of the PINE (100) from PIN (1000) using the user interface or from the user interface of the PEMC (200A)/the PEGC (200B)/the PINNF (300)/the PINAF (400).
  1) If the PINE (100) is about to be added into maximum possible PINs.
    I. The 5GC/the PEMC (200A)/the PINNF (300)/the PINAF (400)/the user may assign a max PIN values for the PINE.
    II. When the PINE (100) has already joined maximum possible PINs, the PEMC (200A)/the PEGC (200B)/the PINNF (300)/the PINAF (400) can request release from any existing one of the PIN (1000). The PEMC (200A)/the PINNF (300)/the 5GC/the PINAF (400) can trigger the PIN (1000) release based on policy considerations (such as operator policy, priority of the PINs, priority of the PINE (100) within each PIN)
  2) After execution of the required service
    I. The PINE (100) can be added dynamically to the PIN (1000) based on the required service. Thus, upon completion of the specific service, PEMC (200A)/the PEGC (200B)/the PIN-NF (300)/the PINAF (400) can request release/delete from the PIN (1000).
  3) Based on operator policy pushed into PINE or subscription.
    The PEMC (200A)/the PEGC (200B)/the PIN-NF (300)/the PINAF (400) can request release/delete from PIN (1000) based on operator policy or subscription. i.e., for example, the subscription is expired which can be based on amount of data consumed or time validity of the subscription.
  4) Based on determination that maximum number of PINEs have been added to the PIN (1000) by the PEMC (200A)/the PEGC (200B)/the PINNF (300)/the PINAF (400).
    I. Depending upon subscription or operator policy, a PIN (1000) can have a maximum number of PINEs criteria.
    II. During PIN creation or PIN management, the maximum number of PINEs that can be added to PIN (1000) is updated in PIN entities (PEMC (200A)/PEGC (200B)/PINAF (400)/PINNF (300)).
    III. Once the PIN (1000) has maximum number of PINEs, a certain PINE can be released from PIN (1000) by PEMC (200A)/PEGC (200B)/5GC/PINAF (400).

When the PINE (100) moves out of the location, the PINE (100) is supposed to operate and receive PIN services. If the PEMC (200A)/PEGC (200B)/PINNF (300)/5GC/PINAF (400) detects that the PINE (100) has moved out of the location (using any location estimation technique such as Geolocation tracking or location based services defined in 3GPP etc.), the PEMC (200A)/PEGC (200B)/PINNF (300)/5GC/the PINAF (400) can initiate the release of the respective PINE (100) from the PIN procedure.

If PEMC (200A)/PEGC (200B)/PINNF (300)/5GC/the PINAF (400) detects that the services offered by the PINE (100) is barred or restricted from at least one of the 5GC/the PINAF (400)/the PINNF (300)/the PEGC (200B)/the PEMC (200A), then at least one of them initiates the PINE release procedure to release the PINE (100) from the PIN (1000).

If the PEMC (200A)/the PEGC (200B)/the PINNF (300)/the 5GC/the PINAF (400) detects that the PIN (1000) is barred or restricted from at least one of the 5GC/the PINAF (400)/the PINNF (300)/the PEGC (200B)/the PEMC (200A), then at least one of them initiates the PINE release procedure to release all the PINE's from the PIN (1000). That is, the PEMC (200A)/the PEGC (200B)/the PINNF (300)/the 5GC/the PINAF (400) can trigger PIN release procedure.

The release/delete/remove are the terms used in this embodiment denote a procedure which is used to remove the PINE (100) from the PIN (1000). i.e., after execution of the procedure, the PINE (100) may not be part of the PIN (1000).

Figure 4:
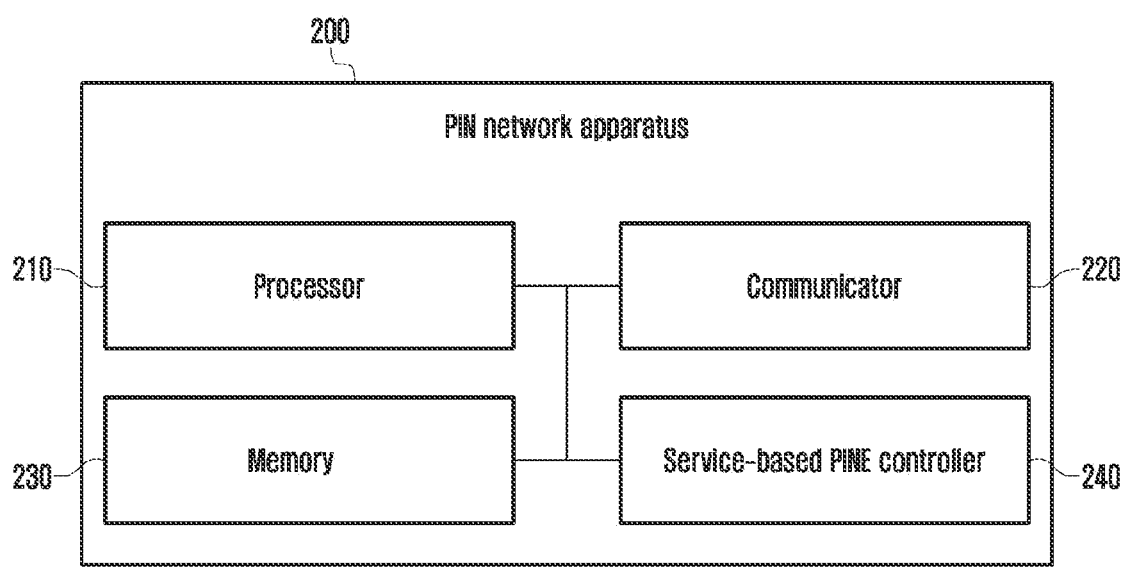
FIG. 4 illustrates a PIN network apparatus according to the embodiments as disclosed herein.

FIG. 4 illustrates the PIN network apparatus (200) according to embodiments as disclosed herein. The PIN network apparatus (200) can be, for example, but not limited to the PEMC (200A), the PINMF, the PINNF (300), the PEGC (200B), and the PINAF (400). In an embodiment, the PIN network apparatus (200) includes a processor (210), a communicator (220), a memory (230) and a service-based PINE controller (240). The processor (210) is coupled with the communicator (220), the memory (230) and the service-based PINE controller (240).

The service-based PINE controller (240) broadcasts the PIN information to the plurality of PINEs. The PIN information includes a supported service or device type indicating a particular service supported by PINE (100) available in the PIN (1000), a requested service or device type indicating the at least one requested service which PINE (100) may support, a group ID or a PIN identifier, a time window within which the network apparatus (200) expects join requests from the PINE (100) of the plurality of PINE, and a user defined name indicating in which the PINE (100) to be added to the PIN (1000).

Further, the service-based PINE controller (240) receives the first message to join the PIN (1000) from the first PINE (100a) from the plurality of PINEs based on the PIN information. The first message includes security credentials of the first PINE (100a), the service offered by the first PINE (100a) and the service requested by the first PINE (100a) in the PIN (1000). Further, the service-based PINE controller (240) determines the second PINE (100b) from the plurality of PINEs that supports the service requested by the first PINE (100a) in the PIN (1000).

In an embodiment, the service-based PINE controller (240) detects that the second PINE (100b) that supports the service requested by the first PINE (100a) has not joined the PIN (1000). Further, the service-based PINE controller (240) sends a service request message to the plurality of PINEs to detect the second PINE (100b) that supports the service requested by the first PINE (100a) in the PIN (1000). Further, the service-based PINE controller (240) receives the first message to join the PIN (1000) from the second PINE (100b). The first message comprises security credentials of the second PINE (100b), the service offered by the second PINE (100b). Further, the service-based PINE controller (240) adds the second PINE (100b) into the PIN (1000) based on the security information of the second PINE (100b) and the PIN information by validating the second PINE (100b) based on the security credentials of the second PINE (100b) and the PIN information. Further, the service-based PINE controller (240) sends a second message to the second PINE (100b) indicating joining of the second PINE (100b) into the PIN (1000) that supports the service requested by the first PINE (100a) in the PIN (1000).

Further, the service-based PINE controller (240) starts a timer after sending the service request message to the plurality of PINEs to detect the second PINE (100b) that supports the service requested by the first PINE (100a) in the PIN (1000). The timer includes a timer window within which the network apparatus (200) expects join requests from the at least one second PINE (100b) of the plurality of PINE. Further, the service-based PINE controller (240) determines whether the join request is received from the second PINE (100b) before expiry of the timer. In an embodiment, the service-based PINE controller (240) adds the second PINE (100b) into the PIN (1000) when the join request is received from the second PINE (100b) before expiry of the timer. In another embodiment, the service-based PINE controller (240) sends a PIN reject request message to the first PINE (100a) indicating the service is not available in the PIN when the join request is not received from the second PINE (100b) before expiry of the timer.

Further, the service-based PINE controller (240) adds the first PINE (100a) into the PIN (1000) based on the security credentials of the first PINE (100a) and the PIN information by validating the first PINE (100a) based on the security credentials of the first PINE (100a) and the PIN information. Further, the service-based PINE controller (240) sends the second message to the first PINE (100a) indicating joining of the first PINE (100a) into the PIN (1000). The second message includes an PIN identifier of the second PINE (100b) that supports the service requested by the first PINE (100a) in the PIN (1000).

The service-based PINE controller (240) is implemented by analog and/or digital circuits such as logic gates, integrated circuits, microprocessors, microcontrollers, memory circuits, passive electronic components, active electronic components, optical components, hardwired circuits and the like, and may optionally be driven by firmware.

Further, the processor (210) is configured to execute instructions stored in the memory (230) and to perform various processes. The communicator (220) is configured for communicating internally between internal hardware components and with external devices via one or more networks. The memory (230) also stores instructions to be executed by the processor (210). The memory (230) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (230) may, in some examples, be considered a non-transitory storage medium. The term "non-transitory" may indicate that the storage medium is not embodied in a carrier wave or a propagated signal. However, the term "non-transitory" should not be interpreted that the memory (230) is non-movable. In certain examples, a non-transitory storage medium may store data that can, over time, change (e.g., in Random Access Memory (RAM) or cache).

Although the FIG. 4 shows various hardware components of the network apparatus (200) but it is to be understood that other embodiments are not limited thereon. In other embodiments, the PIN network apparatus (200) may include less or more number of components. Further, the labels or names of the components are used only for illustrative purpose and does not limit the scope of the present disclosure. One or more components can be combined together to perform same or substantially similar function in the PIN network apparatus (200).

Figure 5:
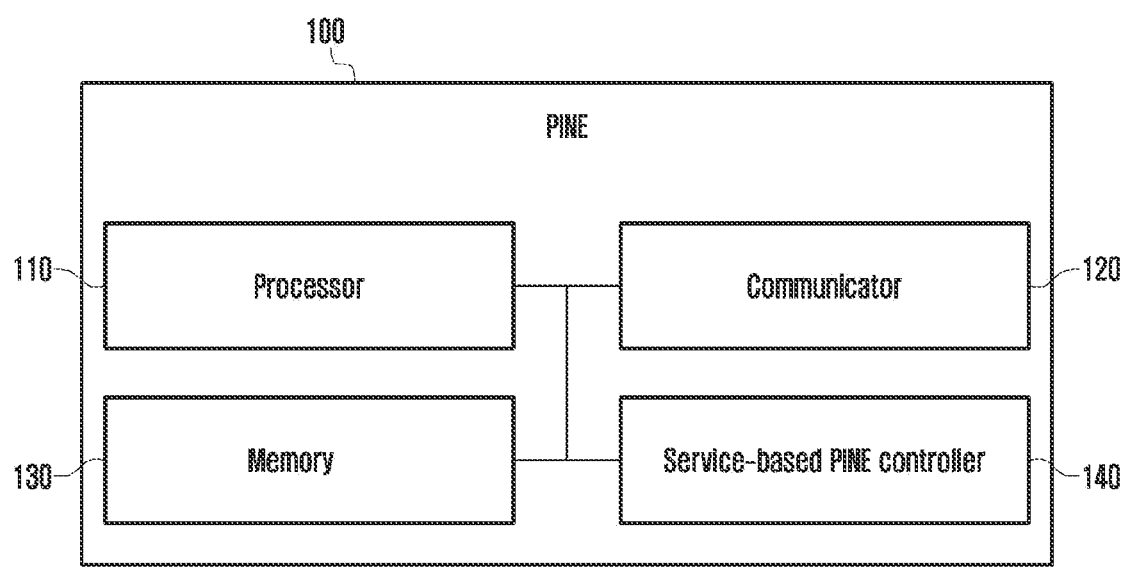
FIG. 5 illustrates the PINE according to the embodiments as disclosed herein.

FIG. 5 illustrates the PINE (100) according to the embodiments as disclosed herein. In an embodiment, the PINE (100) includes a processor (110), a communicator (120), a memory (130) and a service-based PINE controller (140). The processor (110) is coupled with the communicator (120), the memory (130) and the service-based PINE controller (140).

Consider, the PINE (100) is the first PINE (100a). The service-based PINE controller (140) receives the PIN information broadcasted by the PIN network apparatus (200). Further, the service-based PINE controller (140) determines whether to send the first message to the PIN network apparatus (200) based on the local configuration and the PIN information received from the PIN network apparatus (200).

Further, the service-based PINE controller (140) sends the first message to join the PIN based on the PIN information. The first message includes security credentials for verification of the first PINE (100a), the service offered by the first PINE (100a) and the service requested by the first PINE (100a) in the PIN (1000). Further, the service-based PINE controller (140) receives the second message from the network apparatus (200) indicating joining of the first PINE (100*a*) into the PIN (1000). The second message includes the PIN identifier of the second PINE (100*b*) that supports the service requested by the first PINE (100*a*) in the PIN (1000). Further, the service-based PINE controller (140) performs the PIN-PIN communication with the second PINE (100*b*) based on the PIN identifier of the second PINE (100*b*). Further, the service-based PINE controller (140) receives the service from another PIN (e.g., second PIN).

Consider, the PINE (100) is the second PINE (100*b*). The service-based PINE controller (140) receives the PIN information broadcasted by the PIN network apparatus (200). Further, the service-based PINE controller (140) receives the service request message for support of the service requested by the first PINE (100*a*) from the network apparatus (200). Further, the service-based PINE controller (140) determines whether to send the first message to the network apparatus (200) based on the local configuration and the PIN information received from the PIN network apparatus (200).

Further, the service-based PINE controller (140) sends the first message to join the PIN (1000) based on the PIN information and the service request message. The first message includes security credentials for verification of the second PINE (100*b*), the service offered by the second PINE (100*b*) and the service requested by the second PINE (100*b*) in the PIN (1000).

Further, the service-based PINE controller (140) receives the second message from the PIN network apparatus (200) indicating joining of the second PINE (100) into the PIN (1000) that supports the service requested by the first PINE (100*a*) in the PIN (1000). Further, the service-based PINE controller (140) receives the PIN-PIN communication including the PIN identifier of the second PINE (100*b*) from the first PINE (100*a*). Further, the service-based PINE controller (140) send the service from the second PIN.

The service-based PINE controller (140) is implemented by analog and/or digital circuits such as logic gates, integrated circuits, microprocessors, microcontrollers, memory circuits, passive electronic components, active electronic components, optical components, hardwired circuits and the like, and may optionally be driven by firmware.

Further, the processor (110) is configured to execute instructions stored in the memory (130) and to perform various processes. The communicator (120) is configured for communicating internally between internal hardware components and with external devices via one or more networks. The memory (130) also stores instructions to be executed by the processor (110). The memory (130) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (130) may, in some examples, be considered a non-transitory storage medium. The term "non-transitory" may indicate that the storage medium is not embodied in a carrier wave or a propagated signal. However, the term "non-transitory" should not be interpreted that the memory (130) is non-movable. In certain examples, a non-transitory storage medium may store data that can, over time, change (e.g., in random access memory (RAM) or cache).

Although the FIG. 5 shows various hardware components of the PINE (100) but it is to be understood that other embodiments are not limited thereon. In other embodiments, the PINE (100) may include less or more number of components. Further, the labels or names of the components are used only for illustrative purpose and does not limit the scope of the present disclosure. One or more components can be combined together to perform same or substantially, similar function in the PINE (100).

Figure 6:
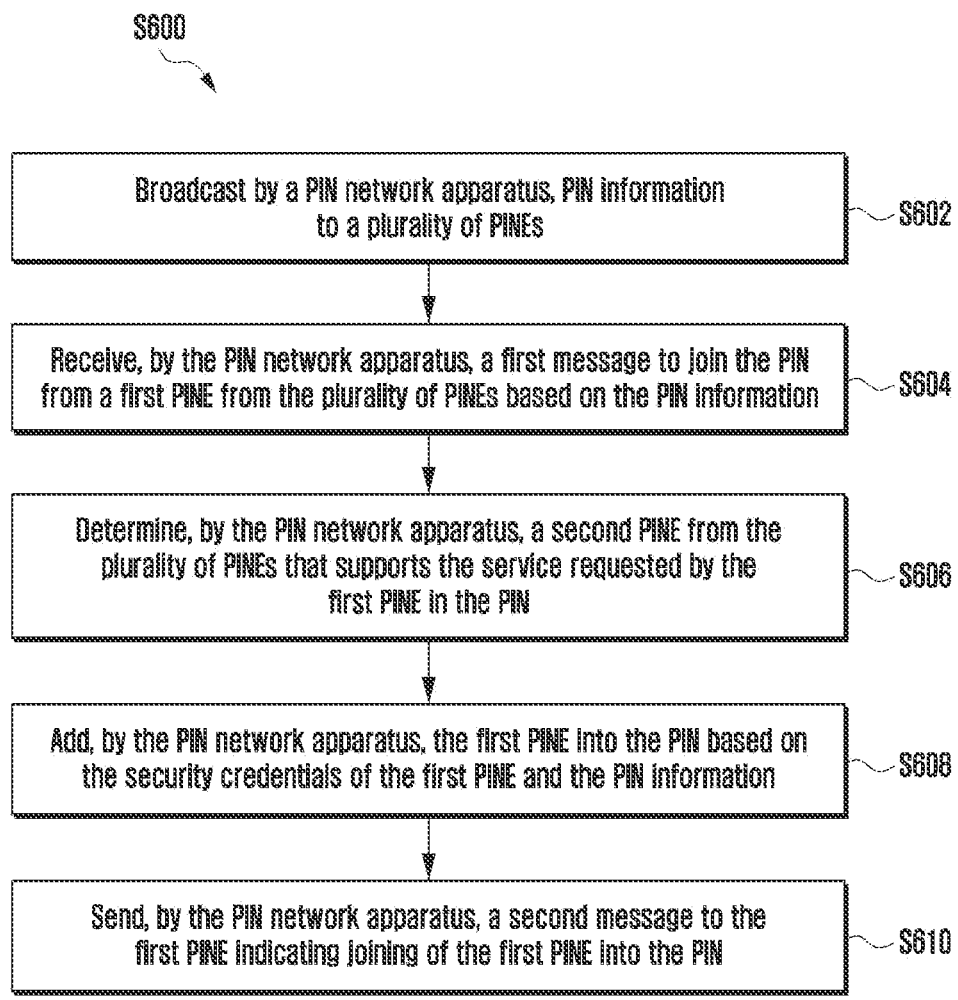
FIG. 6 illustrates a flowchart of a method, implemented by the PIN network apparatus, for service-based joining of the PINE into the PIN according to embodiments as disclosed herein.

FIG. 6 illustrates a flowchart (S600) of a method, implemented by the PIN network apparatus (200), for service-based joining of the PINE (100) into the PIN (1000) according to embodiments as disclosed herein. The operations (S602-S610) are handled by the service-based PINE controller (240).

At step S602, the method includes broadcasting the PIN information to the plurality of PINEs (100*a*-100*b*). At step S604, the method includes receiving the first message to join the PIN (1000) from the first PINE (100*a*) from the plurality of PINEs based on the PIN information. The first message includes security credentials of the first PINE (100*a*), the service offered by the first PINE (100*a*) and the service requested by the first PINE (100*a*) in the PIN (1000). At step S606, the method includes determining the second PINE (100*b*) from the plurality of PINES that supports the service requested by the first PINE in the PIN (1000).

At step S608, the method includes adding the first PINE (100*a*) into the PIN (1000) based on the security credentials of the first PINE (100*a*) and the PIN information. At step S610, the method includes sending the second message to the first PINE (100*a*) indicating joining of the first PINE (100*a*) into the PIN (1000). The second message includes the PIN identifier of the second PINE (100*b*) that supports the service requested by the first PINE (100*a*) in the PIN (1000).

Figure 7:
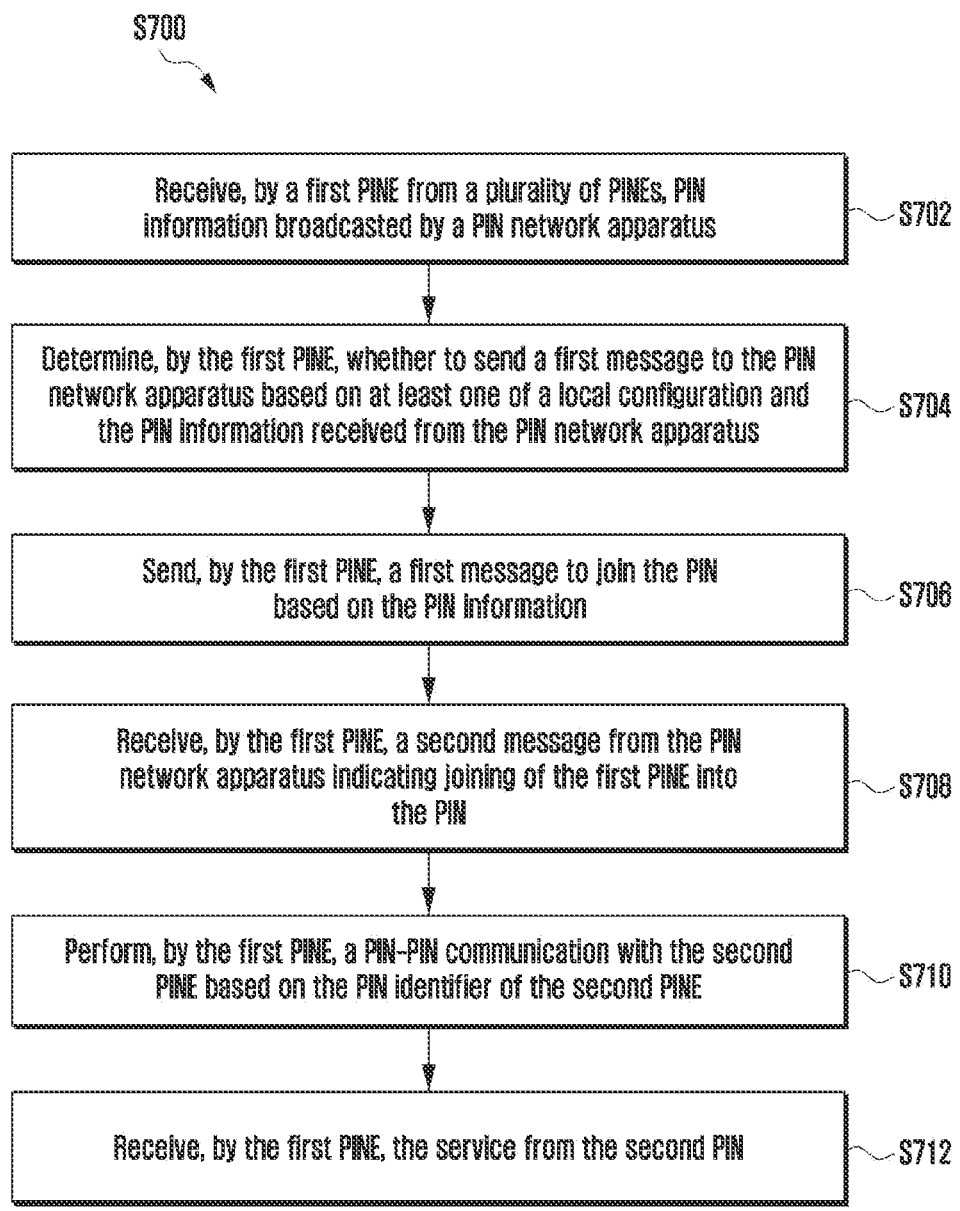
FIG. 7 illustrates a flowchart of a method, implemented by the first PINE, for service-based joining of the PINE into the PIN according to embodiments as disclosed herein.

FIG. 7 illustrates a flowchart (S700) of a method, implemented by the first PINE (100*a*), for service-based joining of the PINE into the PIN (1000) according to embodiments as disclosed herein. The operations (S702-S712) are handled by the service-based PINE controller (140).

At step S702, the method includes receiving the PIN information broadcasted by the PIN network apparatus (200). At step S704, the method includes determining whether to send the first message to the PIN network apparatus (200) based on at least one of the local configuration and the PIN information received from the PIN network apparatus (200).

At step S706, the method includes sending the first message to join the PIN (1000) based on the PIN information. The first message includes security credentials for verification of the first PINE (100*a*), the service offered by the first PINE (100*a*) and the service requested by the first PINE (100*a*) in the PIN (1000). At step S708, the method includes receiving the second message from the PIN network apparatus (200) indicating joining of the first PINE (100*a*) into the PIN (1000). The second message includes an PIN identifier of the second PINE (100*b*) that supports the service requested by the first PINE (100*a*) in the PIN (1000).

At step S710, the method includes performing the PIN-PIN communication with the second PINE (100*b*) based on the PIN identifier of the second PINE (100*b*). At step S712, the method includes receiving the service from the second PIN.

FIG. 8 illustrates a flowchart (S800) of a method, implemented by the second PINE (100*b*), for service-based joining of the PINE (100) into the PIN (1000) according to embodiments as disclosed herein. The operations (S802-S814) are handled by the service-based PINE controller (140).

At step S802, the method includes receiving the PIN information broadcasted by the PIN network apparatus (200). At step S804, the method includes receiving the service request message for support of the service requested by the first PINE (100a) from the PIN network apparatus (200). At step S806, the method includes determining whether to send the first message to the network apparatus (200) based on at least one the local configuration and the PIN information received from the PIN network apparatus (200).

At step S808, the method includes sending the first message to join the PIN (1000) based on the PIN information and the service request message. The first message includes security credentials for verification of the second PINE (100b), the service offered by the second PINE (100b) and the service requested by the second PINE (100b) in the PIN (1000). At step S810, the method includes receiving the second message from the network apparatus (200) indicating joining of the second PINE (100b) into the PIN (1000) that supports the service requested by the first PINE (100a) in the PIN (1000). At step S812, the method includes receiving the PIN-PIN communication comprising the PIN identifier of the second PINE (100b) from the first PINE (100a). At step S814, the method includes sending the service from the second PIN.

In an embodiment, the services term is used as an example but it can be any of the parameters of the PIN information discussed in this embodiment. The term service can be replaced by those parameter and same solution applies.

The various actions, acts, blocks, steps, or the like in the flow charts (S600-S800) may be performed in the order presented, in a different order or simultaneously. Further, in some embodiments, some of the actions, acts, blocks, steps, or the like may be omitted, added, modified, skipped, or the like without departing from the scope of the present disclosure.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope of the embodiments as described herein.

Although the present disclosure has been described with various embodiments, various changes and modifications may be suggested to one skilled in the art. It is intended that the present disclosure encompass such changes and modifications as fall within the scope of the appended claims.

What is claimed is:

1. A method of a personal internet of things network element with management capability (PEMC), the method comprising:
    transmitting a first message comprising information related to a personal internet of things network (PIN);
    receiving, from a first personal internet of things network element (PINE), a first joining request message comprising information on a supported service of the first PINE;
    determining whether to add the first PINE in the PIN based on the information on the supported service; and
    transmitting, to the first PINE, a first joining accept message comprising at least one identifier (ID) of at least one PINE in the PIN based on a determination that the first PINE is added in the PIN.

2. The method of claim 1, wherein transmitting the first message comprises:
    receiving, from the first PINE, a second message to query services in the PIN; and
    transmitting the first message comprising the information related to the PIN.

3. The method of claim 1, further comprising:
    receiving, from a second PINE, a second joining request message comprising information on a requested service of the second PINE;
    in case that the requested service of the second PINE is not offered by the PIN, transmitting a third message comprising the information on the requested service of the second PINE,
    receiving, from a third PINE that offers the requested service of the second PINE, a third joining request message;
    transmitting, to the third PINE, a second joining accept message;
    determining whether to add the second PINE in the PIN based on the information on the requested service of the second PINE; and
    transmitting, to the second PINE, a third joining accept message based on a determination that the second PINE is added in the PIN.

4. The method of claim 3, in case that there is no answer to the third message within a certain period of time, transmitting, to the second PINE, a joining reject message.

5. The method of claim 1, wherein the first message further comprises at least one of supported PIN services, requested PIN services, information of a timer, an identifier (ID), or a group ID, and
    wherein the first joining request message further comprises security credentials that enables the PEMC to validate the first PINE.

6. A method of a personal internet of things network element (PINE), the method comprising:
    receiving, from a personal internet of things network element with management capability (PEMC), a first message comprising information related to a personal internet of things network (PIN);
    transmitting, to the PEMC, a first joining request message comprising information on a supported service of the PINE; and
    receiving, from the PEMC, a first joining accept message comprising at least one identifier (ID) of at least one PINE in the PIN in case that the PINE is added in the PIN based on the information on the supported service.

7. The method of claim 6, wherein receiving the first message comprises:
    transmitting, to the PEMC, a second message to query services in the PIN; and
    receiving, from the PEMC, the first message comprising the information related to the PIN.

8. The method of claim 6, further comprising:
    transmitting, to the PEMC, a second joining request message comprising information on a requested service of the PINE; and
    in case that, the requested service of the PINE is not offered by the PIN, another PINE that offers the requested service of the PINE is joined to the PIN, and when the PINE is added in the PIN, receiving, from the PEMC, a second joining accept message.

9. The method of claim 8, in case that the requested service of the PINE is not offered by the PIN and the other PINE is not joined to the PIN, receiving, from the PEMC, a joining reject message.

10. The method of claim 6, wherein the first message further comprises at least one of supported PIN services, requested PIN services, information of a timer, an identifier (ID), or a group ID, and
wherein the first joining request message further comprises security credentials that enables the PEMC to validate the PINE.

11. A personal internet of things network element with management capability (PEMC), the PEMC comprising:
a transceiver; and
a controller coupled with the transceiver and configured to:
transmit a first message comprising information related to a personal internet of things network (PIN),
receive, from a first personal internet of things network element (PINE), a first joining request message comprising information on a supported service of the first PINE,
determine whether to add the first PINE in the PIN based on the information on the supported service, and
transmit, to the first PINE, a first joining accept message comprising at least one identifier (ID) of at least one PINE in the PIN based on a determination that the first PINE is added in the PIN.

12. The PEMC of claim 11, wherein the controller is further configured to:
receive, from the first PINE, a second message to query services in the PIN, and
transmit the first message comprising the information related to the PIN.

13. The PEMC of claim 11, wherein the controller is further configured to:
receive, from a second PINE, a second joining request message comprising information on a requested service of the second PINE,
in case that the requested service of the second PINE is not offered by the PIN, transmit a third message comprising the information on the requested service of the second PINE,
receive, from a third PINE that offers the requested service of the second PINE, a third joining request message,
transmit, to the third PINE, a second joining accept message,
determine whether to add the second PINE in the PIN based on the information on the requested service of the second PINE, and
transmit, to the second PINE, a third joining accept message based on a determination that the second PINE is added in the PIN.

14. The PEMC of claim 13, wherein the controller is further configured to:
in case that there is no answer to the third message within a certain period of time, transmit, to the second PINE, a joining reject message.

15. The PEMC of claim 11, wherein the first message further comprises at least one of supported PIN services, requested PIN services, information of a timer, an identifier (ID), or a group ID, and
wherein the first joining request message further comprises security credentials that enables the PEMC to validate the first PINE.

16. A personal internet of things network element (PINE), the PINE comprising:
a transceiver; and
a controller coupled with the transceiver and configured to:
receive, from a personal internet of things network element with management capability (PEMC), a first message comprising information related to a personal internet of things network (PIN),
transmit, to the PEMC, a first, joining request message comprising information on a supported service of the PINE, and
receive, from the PEMC, a first joining accept message comprising at least one identifier (ID) of at least one PINE in the PIN in case that the PINE is added in the PIN based on the information on the supported service.

17. The PINE of claim 16, wherein the controller is further configured to:
Transmit, to the PEMC, a second message to query services in the PIN; and
receive, from the PEMC, the first message comprising the information related to the PIN.

18. The PINE of claim 16, wherein the controller is further configured to:
transmit, to the PEMC, a second joining request message comprising information on a requested service of the PINE, and
in case that the requested service of the PINE is not offered by the PIN, another PINE that offers the requested service of the PINE is joined to the PIN, and when the PINE is added in the PIN, receive, from the PEMC, a second joining accept message.

19. The PINE of claim 18, wherein the controller is further configured to:
in case that the requested service of the PINE is not offered by the PIN and the other PINE is not joined to the PIN, receive, from the PEMC, a joining reject message.

20. The PINE of claim 16, wherein the first message further comprises at least one of supported PIN services, requested PIN services, information of a timer, an identifier (ID), or a group ID, and
wherein the first joining request message further comprises security credential s that enables the PEMC to validate the PINE.

* * * * *